United States Patent
Dalton, Jr. et al.

(10) Patent No.: US 7,036,965 B2
(45) Date of Patent: May 2, 2006

(54) LIGHT BAR PROVIDING ILLUMINATION FROM INSIDE A VEHICLE

(75) Inventors: William H. Dalton, Jr., Tulsa, OK (US); Steven W. Neufeglise, Rochester, NY (US)

(73) Assignee: Star Headlight and Lantern Co., Inc., Avon, NY (US)

( * ) Notice: Subject to any disclaimer, the term of this patent is extended or adjusted under 35 U.S.C. 154(b) by 128 days.

(21) Appl. No.: 10/414,896

(22) Filed: Apr. 16, 2003

(65) Prior Publication Data

US 2004/0208013 A1    Oct. 21, 2004

(51) Int. Cl.
*B60Q 1/00* (2006.01)
*B60Q 1/26* (2006.01)

(52) U.S. Cl. .............. 362/488; 362/492; 362/545; 362/547; 362/240; 362/368; 362/371; 362/800; 362/427; 362/430

(58) Field of Classification Search ............... 362/488, 362/492, 540, 545, 546, 237, 238, 240, 368, 362/371, 800, 427, 430, 547

See application file for complete search history.

(56) References Cited

U.S. PATENT DOCUMENTS

| | | | |
|---|---|---|---|
| 1,541,376 A | | 6/1925 | Nock |
| 1,672,779 A | | 6/1928 | Raidt |
| 1,674,340 A | | 6/1928 | Nock |
| 2,017,798 A | | 10/1935 | Gillespie |
| 3,318,631 A | | 5/1967 | Levy |
| 3,576,437 A | * | 4/1971 | Peron .................. 362/486 |
| 3,665,392 A | | 5/1972 | Annas |
| 4,733,335 A | | 3/1988 | Serizawa et al. |
| 4,788,630 A | | 11/1988 | Gavagan |
| 4,868,719 A | | 9/1989 | Kouchi et al. |
| D314,244 S | | 1/1991 | Matsumura et al. |
| 4,981,363 A | | 1/1991 | Lipman |
| D315,218 S | | 3/1991 | Matsumura et al. |
| 5,050,051 A | | 9/1991 | Machida et al. |
| 5,099,401 A | | 3/1992 | Kondo et al. |
| 5,124,845 A | * | 6/1992 | Shimojo .................. 359/838 |
| D349,517 S | | 8/1994 | Neff |
| 5,660,457 A | | 8/1997 | Lyons |
| 5,663,707 A | | 9/1997 | Bartilucci |
| 5,671,996 A | * | 9/1997 | Bos et al. .............. 362/488 |
| 5,826,965 A | | 10/1998 | Lyons |
| 5,988,839 A | | 11/1999 | Pokorney et al. |

(Continued)

FOREIGN PATENT DOCUMENTS

GB        2139340 A   *  11/1984

(Continued)

*Primary Examiner*—Sandra O'Shea
*Assistant Examiner*—Sharon Payne
(74) *Attorney, Agent, or Firm*—Kenneth J. Lukacher; Martin Lukacher

(57) ABSTRACT

A light bar contains one or more rows of light-emitting diodes (LED's) in a housing which extends across substantially the entire width of a windshield of a vehicle and is narrow in width to minimize interference with visibility through the windshield. The LED's are arranged in banks generally symmetrically arrayed about the center of the length of the housing. Two of the banks, preferably equidistant from the center, are tilted in opposite directions to each other so as to project light toward the right side and left side of the vehicle. A mechanism is provided for displacing and tilting the housing and may use pivotal arms attached to the end of the housing or adjustable Z-shaped hangers attached preferably to clamps such as visor clips already on the vehicle.

41 Claims, 11 Drawing Sheets

U.S. PATENT DOCUMENTS

| | | | |
|---|---|---|---|
| H1834 H | * 2/2000 | Wilson et al. | 296/97.11 |
| 6,132,072 A | 10/2000 | Turnbull et al. | |
| D447,825 S | 9/2001 | Lee | |
| D464,162 S | 10/2002 | Segretto | |
| 6,461,008 B1 | 10/2002 | Pederson | |
| 6,511,216 B1 | 1/2003 | Strickland | |
| 6,523,976 B1 | 2/2003 | Turnbull et al. | |
| 2001/0046136 A1 | * 11/2001 | Weber et al. | 362/494 |

FOREIGN PATENT DOCUMENTS

| | | | |
|---|---|---|---|
| JP | 04143133 A | * | 5/1992 |
| JP | 06180547 A | * | 6/1994 |

* cited by examiner

AS VIEWED FROM INSIDE VEHICLE

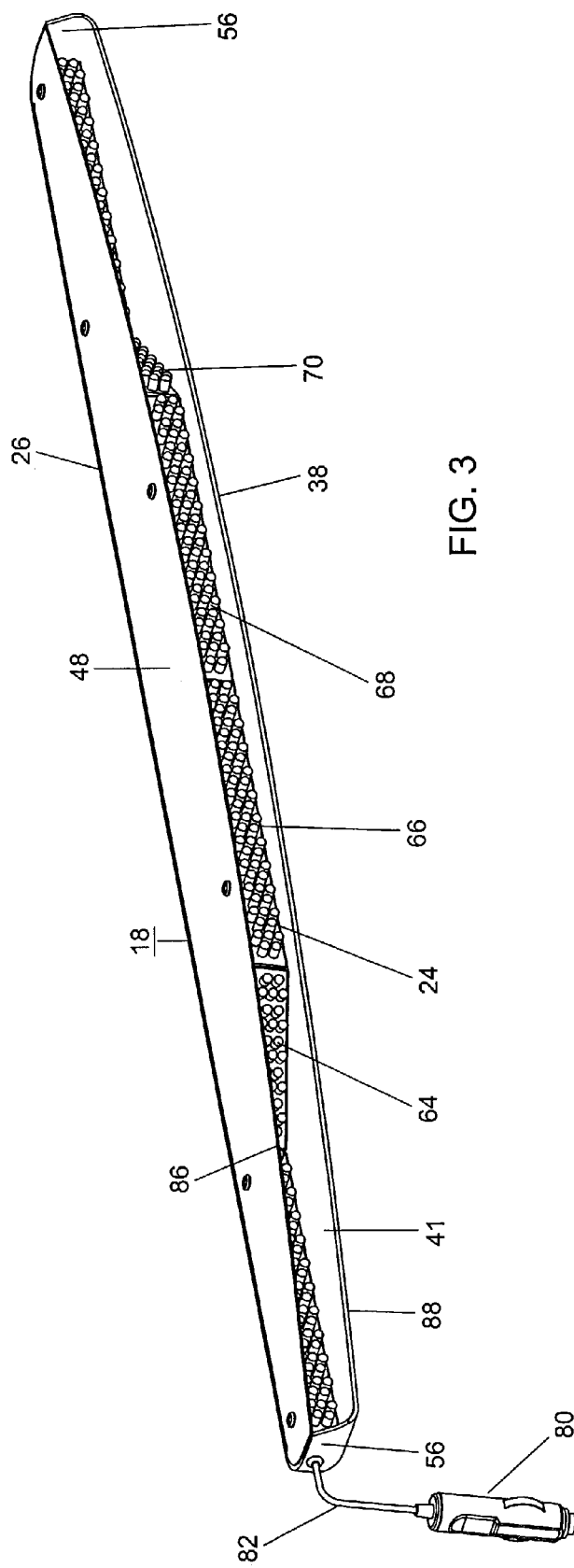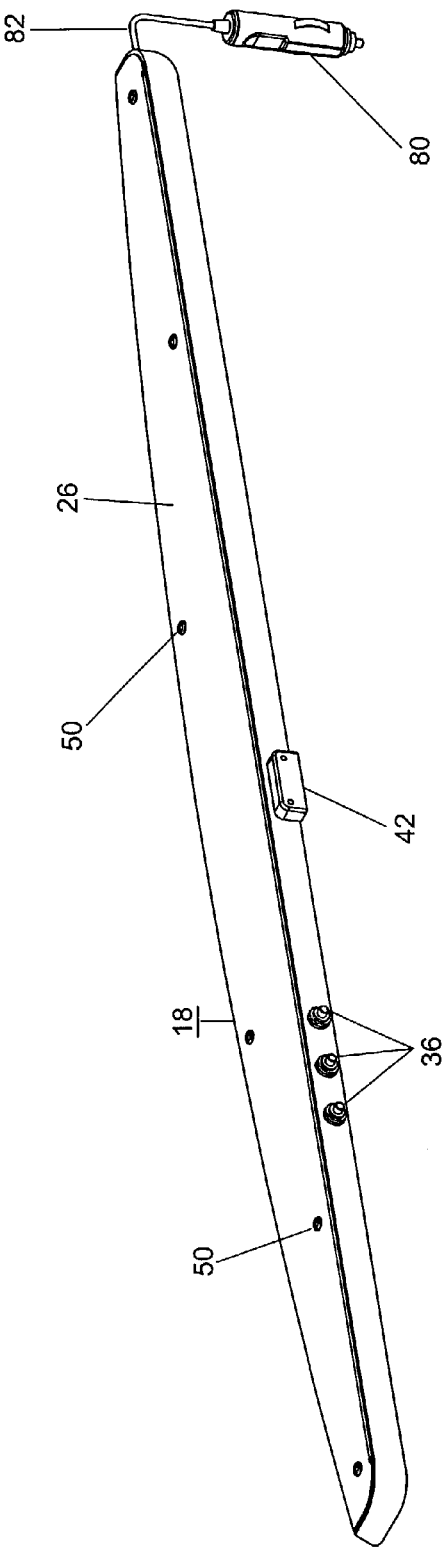

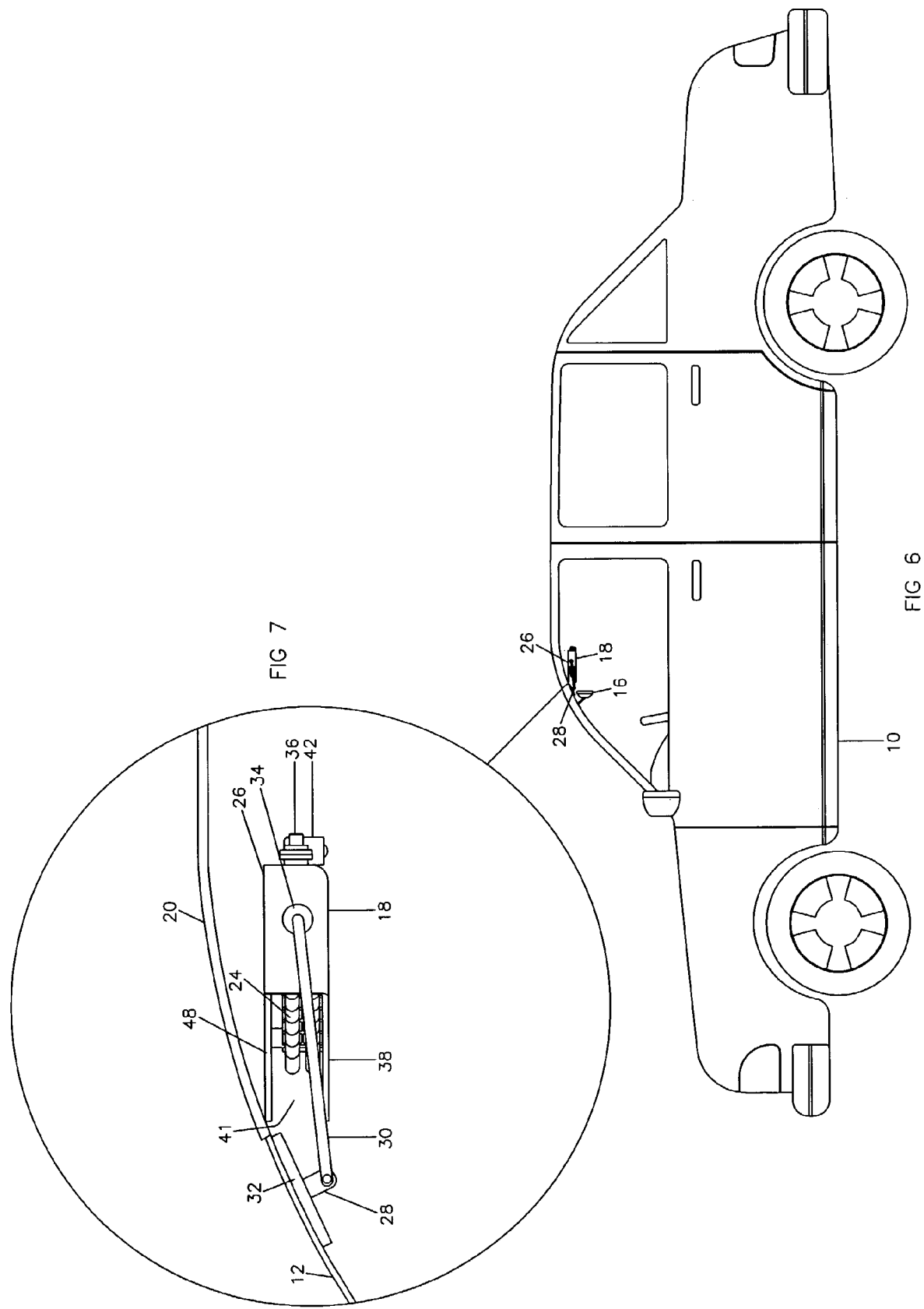

LIGHT BAR PROVIDING ILLUMINATION FROM INSIDE A VEHICLE

The present invention relates to light bars providing illumination from the inside of the vehicle through a window, such as the windshield of the vehicle, whereby the illumination provides signaling or warning functions. More particularly, the light bar provided by the invention contains light emitting diodes (LED's) arrayed and contained so as to minimize interference with visibility through a window via which light from the LED's projects, such light being projectable over a wide angle, as from the right to left sides of a vehicle.

Light sources mounted inside a vehicle have heretofore been proposed. See for example, Nock, U.S. Pat. No. 1,674,340, issued Jun. 19, 1928; Gillespie, U.S. Pat. No. 2,017,798, issued Oct. 15, 1935; Annas, U.S. Pat. No. 3,665,392, issued May 23, 1972; Serizawa, U.S. Pat. No. 4,733,335, issued May 28, 1988; Lipman, U.S. Pat. No. 4,981,363, issued Jan. 1, 1991; Kondo, U.S. Pat. No. 5,099,401, issued Mar. 24, 1992; Pederson, U.S. Pat. No. 6,461,008, issued Oct. 8, 2002 (FIGS. 13 and 14 thereof); and Strickland, U.S. Pat. No. 6,511,216, issued Jan. 28, 2003.

LED's have been used in brake or collision lights which are adapted to be located in the vicinity of the rear window of a vehicle. See Serizawa, U.S. Pat. No. 4,733,335 (noted above); Machida, U.S. Pat. No. 5,050,051, issued Sep. 17, 1991; Bartilluci, U.S. Pat. No. 5,663,707, issued Sep. 2, 1997; Matsumura, U.S. Pat. No. Des. 314,244, issued Jan. 29, 1991; U.S. Pat. No. Des. 315,218, issued Mar. 5, 1991; and Lee, U.S. Pat. No. Des. 447,825, issued Sep. 11, 2001. In U.S. patent application Ser. No. 10/423,102, filed Apr. 25, 2003, in the name of Steven Neufeglise, having priority to U.S. Provisional Application No. 60/375,385, filed Apr. 25, 2002, and assigned to the same assignee as this application, various inside light bars are disclosed which are adapted to be adjustably positioned against the windshield so as to minimize stray illumination.

Notwithstanding the efforts manifested by the above-referenced documents, a practical interior light bar has not been made commercially available. A practical interior light bar capable of producing illumination approaching that provided by external light bars, usually mounted on the top of the roof of the vehicle, is provided by this invention.

Further features of the present invention are to provide an improved interior light bar containing LED's which can extend substantially across the entire width of a window of a vehicle, especially the windshield thereof, and which:

a) can provide wide-angle illumination from the right to left sides of the vehicle as well as straight ahead;

b) is sufficiently small to avoid interference with visibility through the window or windshield;

c) contains the LED's in a manner to avoid stray light, as in a housing which acts as a hood; and is adjustable vertically and angularly so as to be held in proximity to the windshield or window at a desired position, which may be near the top of the windshield; and d) is user controllable to provide different sequences of illumination, such as constant and flashing, which flashing may be of different colors, such as red, blue and amber and in selected sequence suitable for warning applications.

Briefly described, a light bar in accordance with the invention provides illumination from inside a vehicle through a window thereof, especially the windshield. The light bar has a width extending laterally across substantially the entire window and a narrow height. The light bar contains a plurality of LED's in one or more rows arrayed substantially across the entire width of the window in a housing defining a channel having a throat, which directs illumination from the rows of LED's in a beam restricted or hooded by the throat. The beam extends through the window. The LED's may be in banks on opposite sides of the center of the window. At least a pair of these banks, which are preferably symmetrical with respect to the center of the housing, are tilted in opposite directions so as to direct illumination therefrom in a wide angle which extends between the right and left sides of the vehicle. Arms or hangers adjustably mount the housing so as to provide vertical displacement and tilting about a horizontal axis so as to locate the throat in proximity to the window and aim the illumination projected through the window. Circuitry connected to the LED's energizes the banks to selectively provide continuous light or flashing illumination from the banks in sequences as selected by the user.

The foregoing and other objects, features, and advantages of the invention will become more apparent from a reading of the following description in connection with the accompanying drawings in which:

FIG. 3 is a perspective view from the front of the light bar illustrated in FIGS. 1 and 2;

FIG. 4 is a perspective view of the light bar shown in FIG. 3 from the rear;

FIG. 6 is a side view of the vehicle showing the light bar of FIGS. 1 and 2 and how it is suspended on a mechanism attached to the windshield;

FIG. 7 is an expanded view of the side of the light bar illustrating the mechanism shown in FIG. 6 for attaching the light bar to the windshield;

Figure 12:
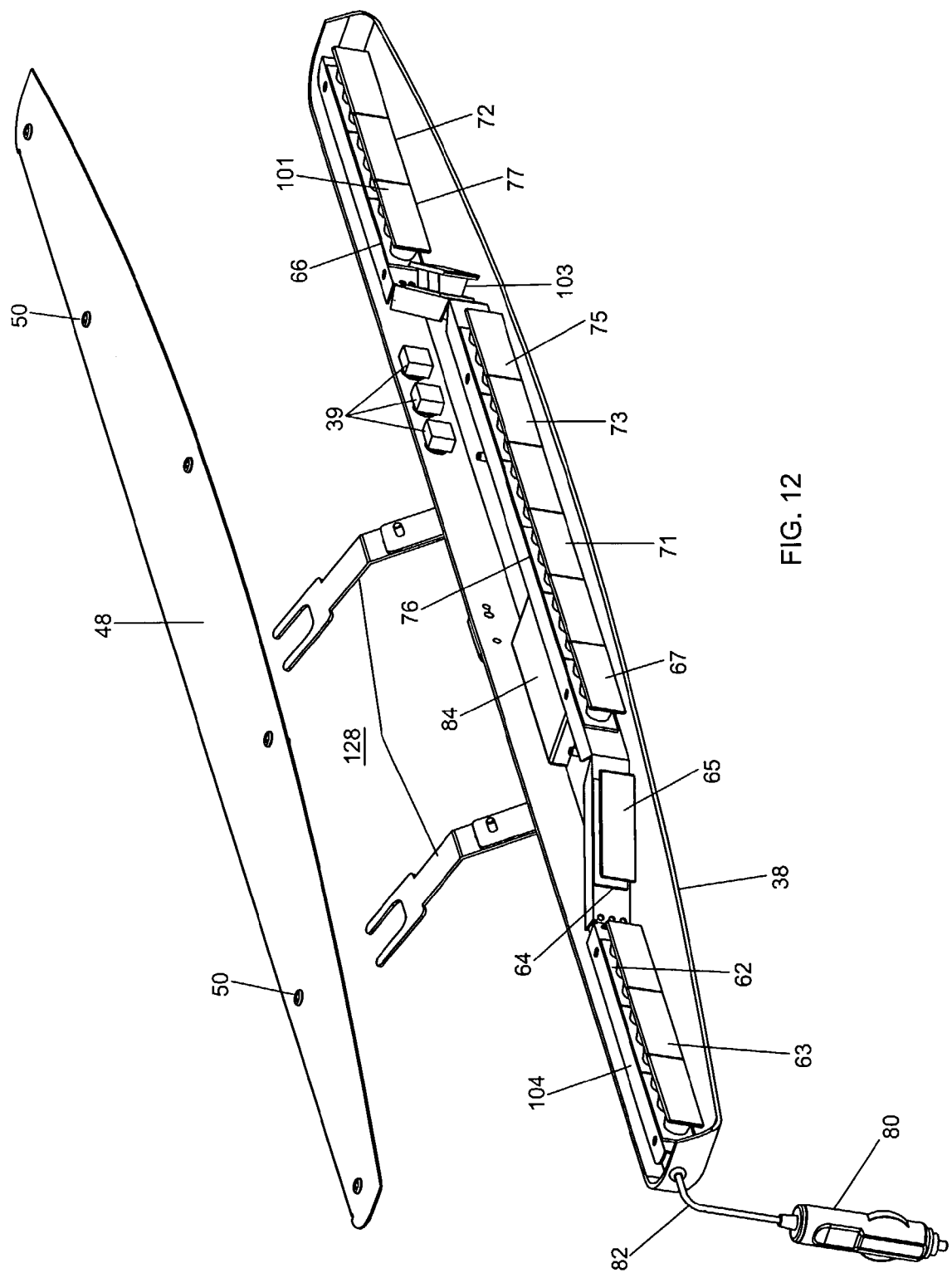
FIG. 12 is an exploded view of the light bar shown in FIGS. 10 and 11 taken from the front illustrating the banks of LED's and optics in the form of lens assemblies assembled with the banks of LED's at the light projecting ends thereof.
Figure 12A:
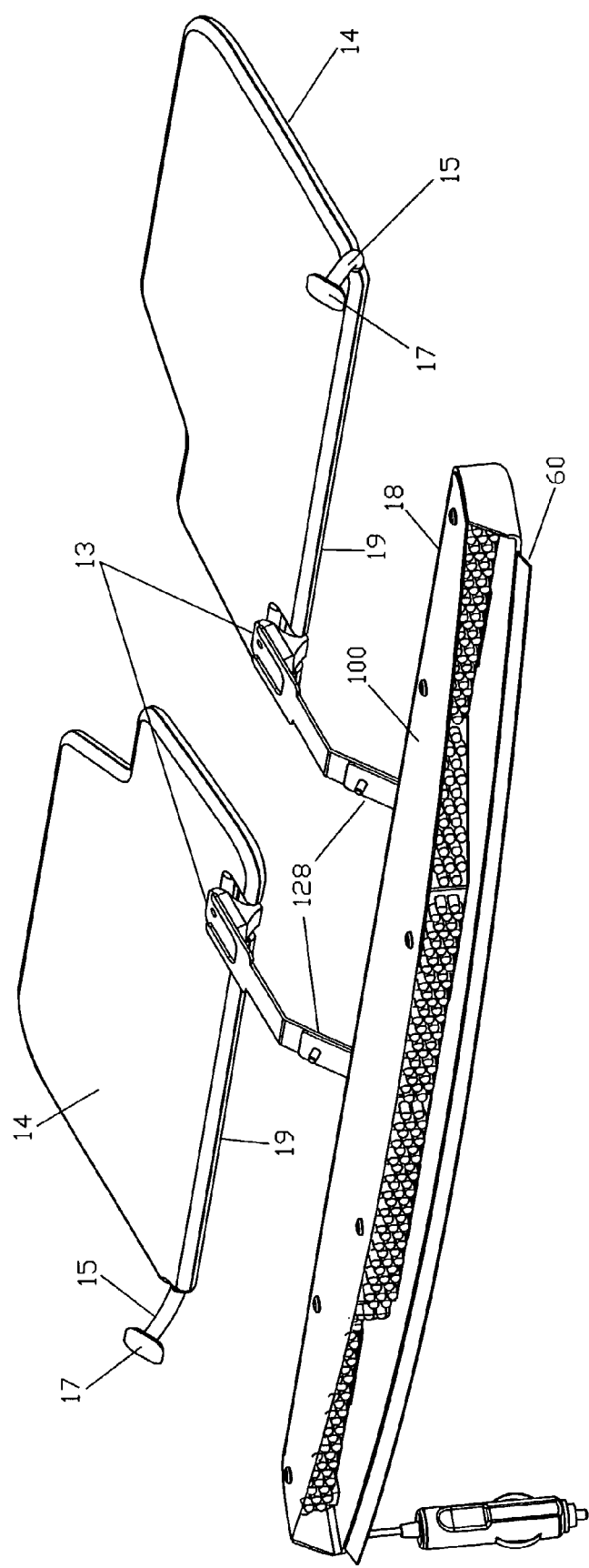
FIG. 12a is a fragmentary end view illustrating how the hanger of the light bar of the present invention is attached to visor clips on the inside of the vehicle above the windshield thereof.

Referring more particularly to FIGS. 1, 2, 6 and 7 of the drawings, there is shown a passenger car type vehicle 10 having a windshield 12. Vehicle sun visors 14 are attached in the conventional way to the vehicle body near the roof of the passenger compartment above the windshield 12 by mounting brackets 17 via rods 15 (see FIG. 12a). FIG. 12a best show rods 15 mounted to brackets 17 in which visors 14 can pivot with the rods 15. Visor clips 13 are mounted to the roof inside of the vehicle. The clips 13 grasp the inside edges 19 of the visors 14. A rearview mirror 16 is attached to the windshield 12 and located between the visors 14.

A light bar 18 provided by the invention is a narrow structure, sufficiently narrow to fit between the visors 14, when in their horizontal or up position, and the roof of the passenger compartment. The light bar 18 has one or more rows of LED's 24, two rows being illustrated in FIGS. 3–5. A housing 26 contains the rows. The housing is shown in detail in FIGS. 3, 4 and 5.

As shown in FIGS. 1, 2, 6 and 7, the ends 56 of the housing 26 are connected to light bar mounts 28. The mounts 28 include pads 32 cemented to the windshield 12, much like the pads to which the rearview mirror 16 is connected. The mounts 28 include arms 30 which are pivotally connected to posts extending from the pads 32 and also to journals or pivots 34 in the ends of the housing 26, as best shown in FIG. 7. These journals or pivots 34 have significant friction so as to maintain the arms 30 in the position to which they are pivoted. The arms 30 allow the light bar 18 to be raised and lowered (displaced vertically) and to be tilted so as to project the illumination in the desired direction through the windshield 12.

Figure 1:
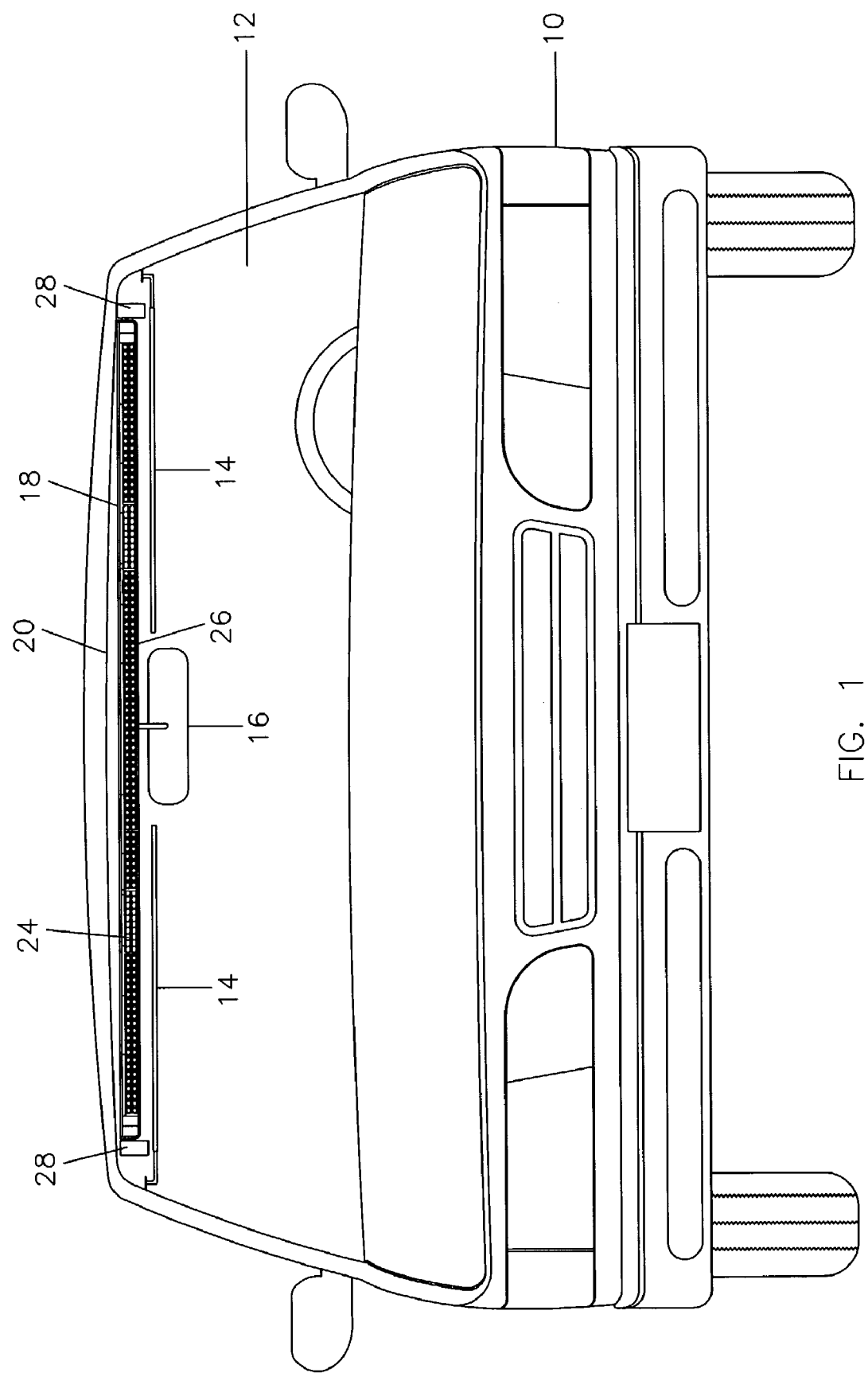
FIG. 1 is a front view of a vehicle showing a light bar provided by the invention mounted therein and illustrating the narrow height of the light bar so that it occupies a space between the visors and the top of the windshield of the vehicle (or the ceiling, or overhead of the vehicle's passenger compartment)
Figure 2:
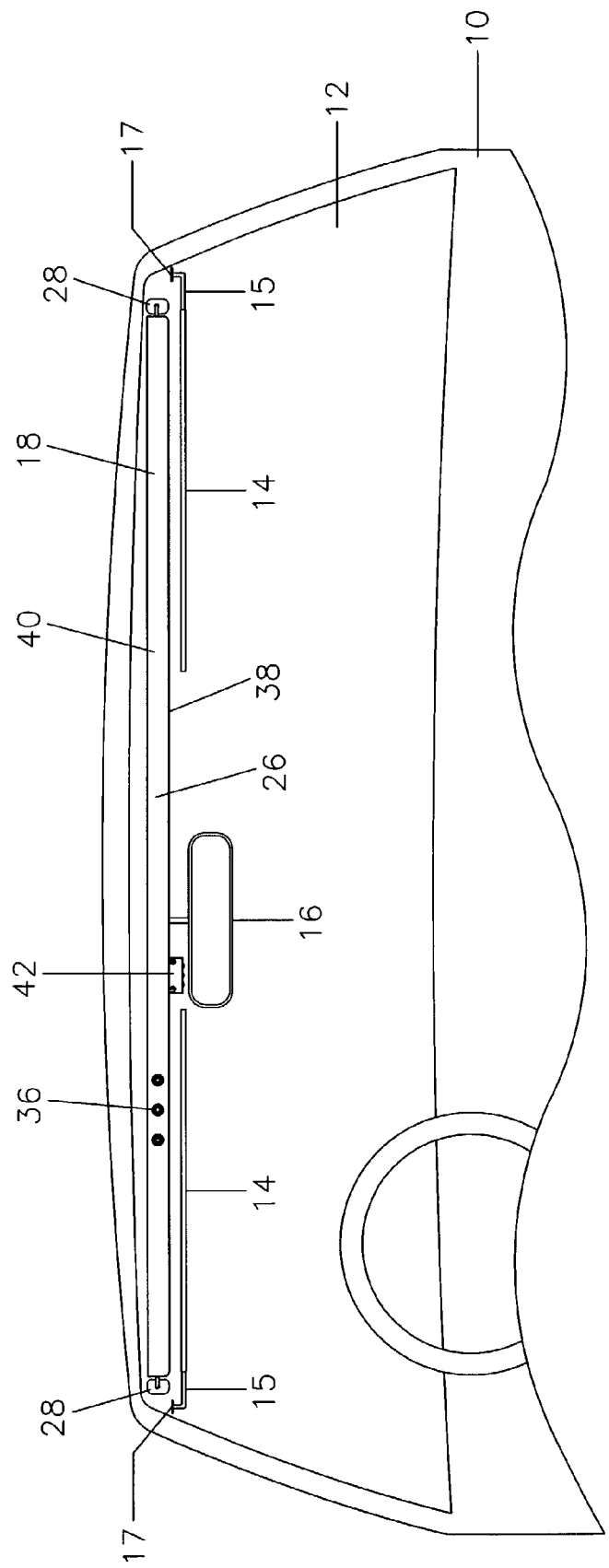
FIG. 2 is a fragmentary view from the inside of the vehicle through the windshield and showing the light bar illustrated in FIG. 1 from the rear thereof.

FIG. 2 shows three buttons 36 which project from switches 39 on the back wall 40 of the bottom 38 of the housing 26. A small housing 42 mounted under the bottom wall 38 or on the back wall 40 of the housing may contain several LED's or other light source(s) which provide interior illumination and function as a dome or map light. See also FIG. 7.

Figure 5:
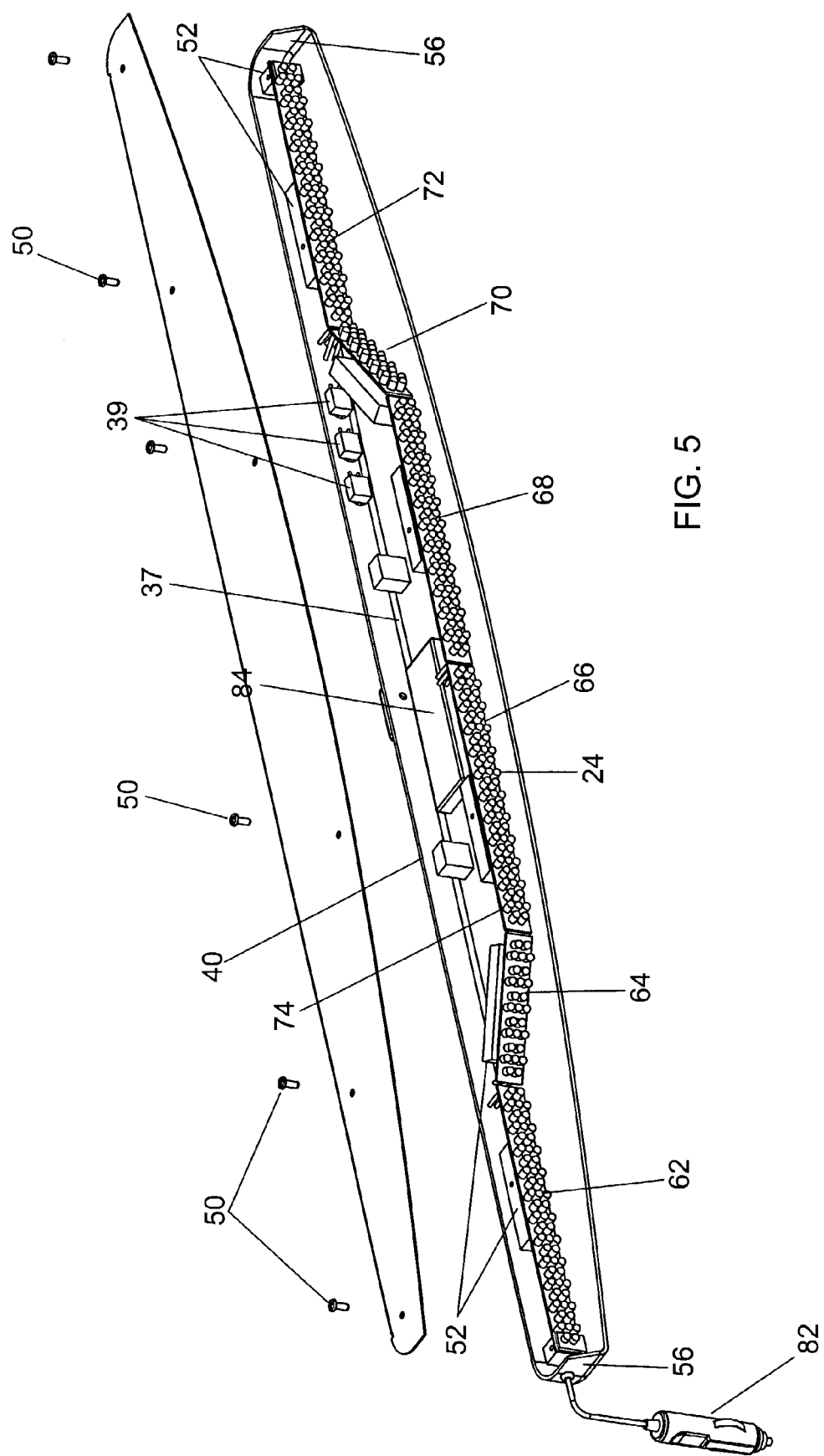
FIG. 5 is an exploded view in perspective of the light bar of FIGS. 1 and 2 taken from the front.
Figure 8:
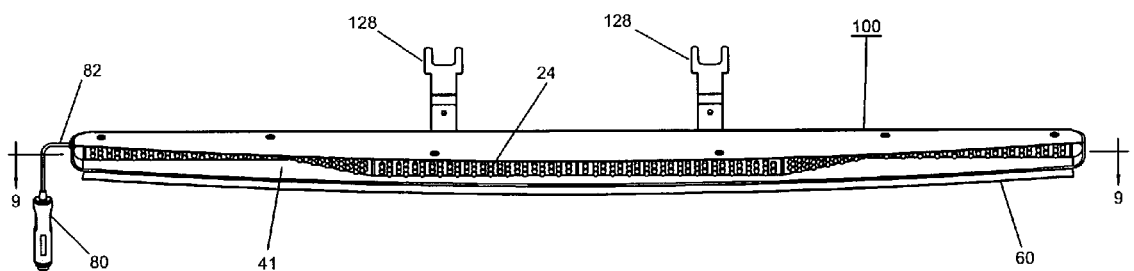
FIG. 8 is a front perspective view of the light bar shown in the previous figures tilted downwardly to show the top of the housing thereof and also front views of adjustable hangers for attaching the light bar to the inside of the vehicle.
Figure 9:
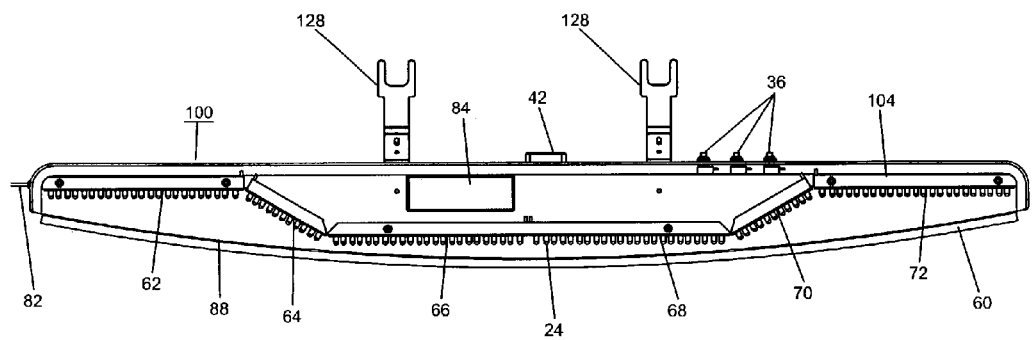
FIG. 9 is a sectional plan view taken along line 9—9 in FIG. 8 so that the top or cover of the housing is not shown.
Figure 10:
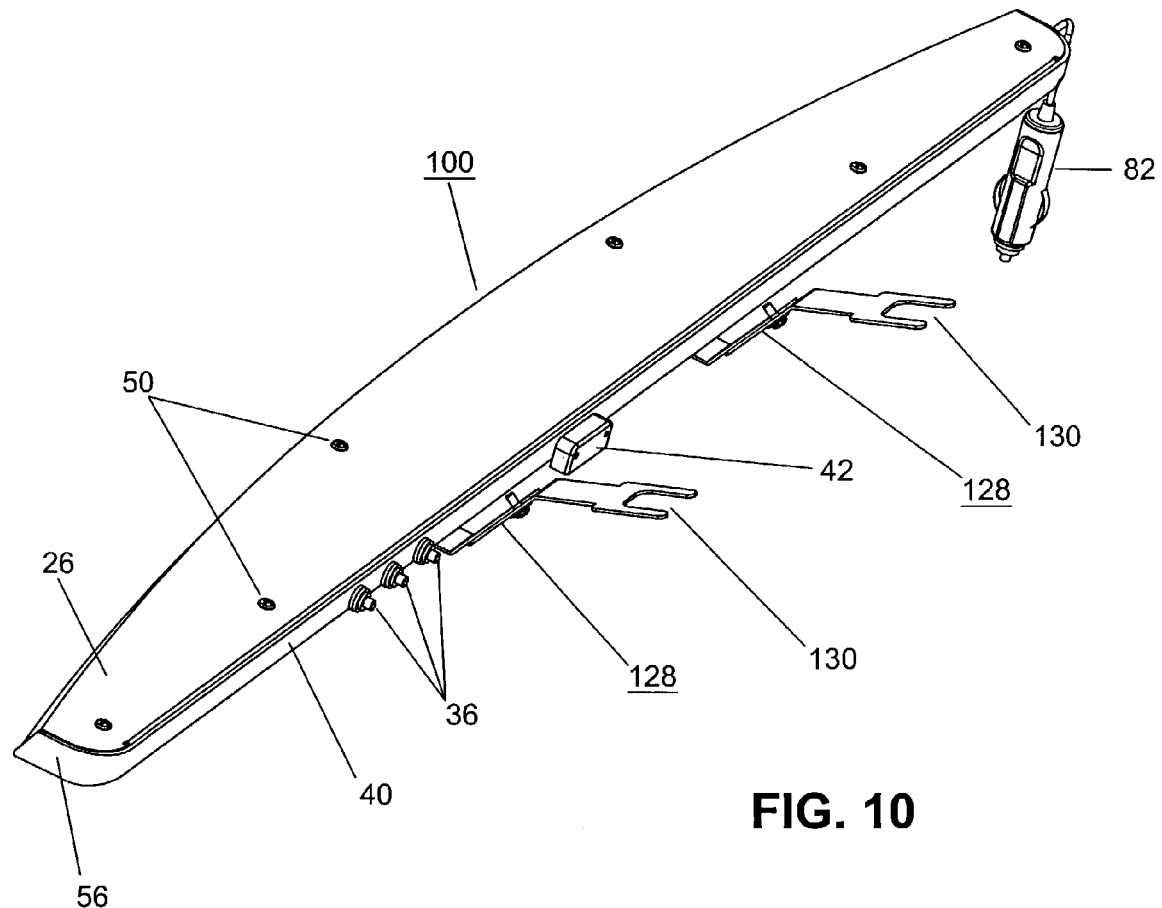
FIG. 10 is a perspective view of the light bar shown in FIGS. 8 and 9 taken from the rear.

Referring to FIGS. 3, 4, and 5, more particularly, there is shown the housing 26, which is made up of the bottom 38 and a top cover 48 which may be attached by screws 50 to thread holes in blocks 52, also serving as spacers, to the bottom 38. The bottom also provides the ends 56 of the housing 26.

Figure 11:
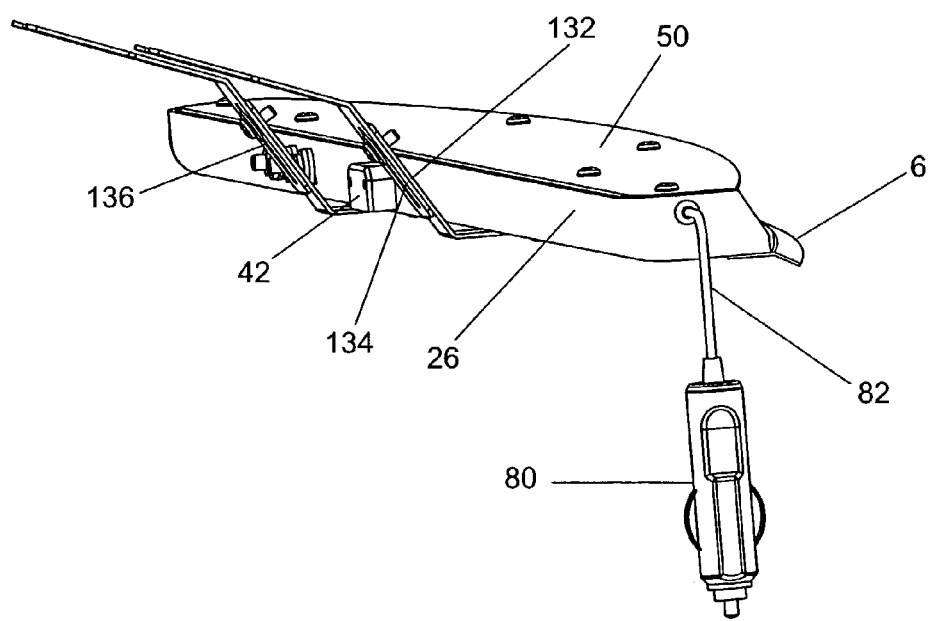
FIG. 11 is a fragmentary perspective view of the light bar shown in FIG. 10 taken from the right side.

The housing 26 is constructed of plates or sheets of flexible material by virtue of their thickness and also by virtue of the use of plastic, such as polycarbonate or PVC materials for the plates. Such material provides some flexibility and resilience against the inside of the windshield. However, it may be desirable to use a rubber gasket 60 attached to the outside surface of the bottom 38, if desired (see FIG. 11 and FIG. 12a).

The top 48 and bottom 38 of the housing 26 define a channel 37 having a throat 41. The LED's 24 are arranged in banks 62, 64, 66, 68, 70, and 72 and project from circuit boards 74 which are attached to the mounting blocks 52. More or fewer LED banks may be provided and additional bank shown at 76 in FIG. 12 may be mounted between banks 66 and 68 and bisected by the center of the light bar. This center may be a plane perpendicular to the base 38 and cover 48, centrally between the ends 56 of the bottom 38.

The mounts 28 (FIGS. 6 and 7) also position the open end or throat 41 of the light bar 18 in proximity to the windshield 12 as best shown in FIG. 7.

The banks are preferably symmetrically disposed about the center of the housing 26. It is a significant feature of the invention to provide wide-angle illumination towards the left and right sides of the vehicle 10 as well as straight ahead. The banks 62, 66, 68 and 72 face ahead through the throat 41. The banks 64 and 70 are tilted in opposite directions so as to project illumination towards the right and left sides of the vehicle. The end banks 62 and 72 may be displaced rearward of the forward arrays 66 and 68. The tilted banks 64 and 70 are at such angles as to connect the ends of the banks 62 and 66, and 68 and 70, respectively. All LED's have an optical axis which point outwardly through the throat 39 and may be mounted perpendicularly to the plane of the base 38 and cover 48.

Figure 13:
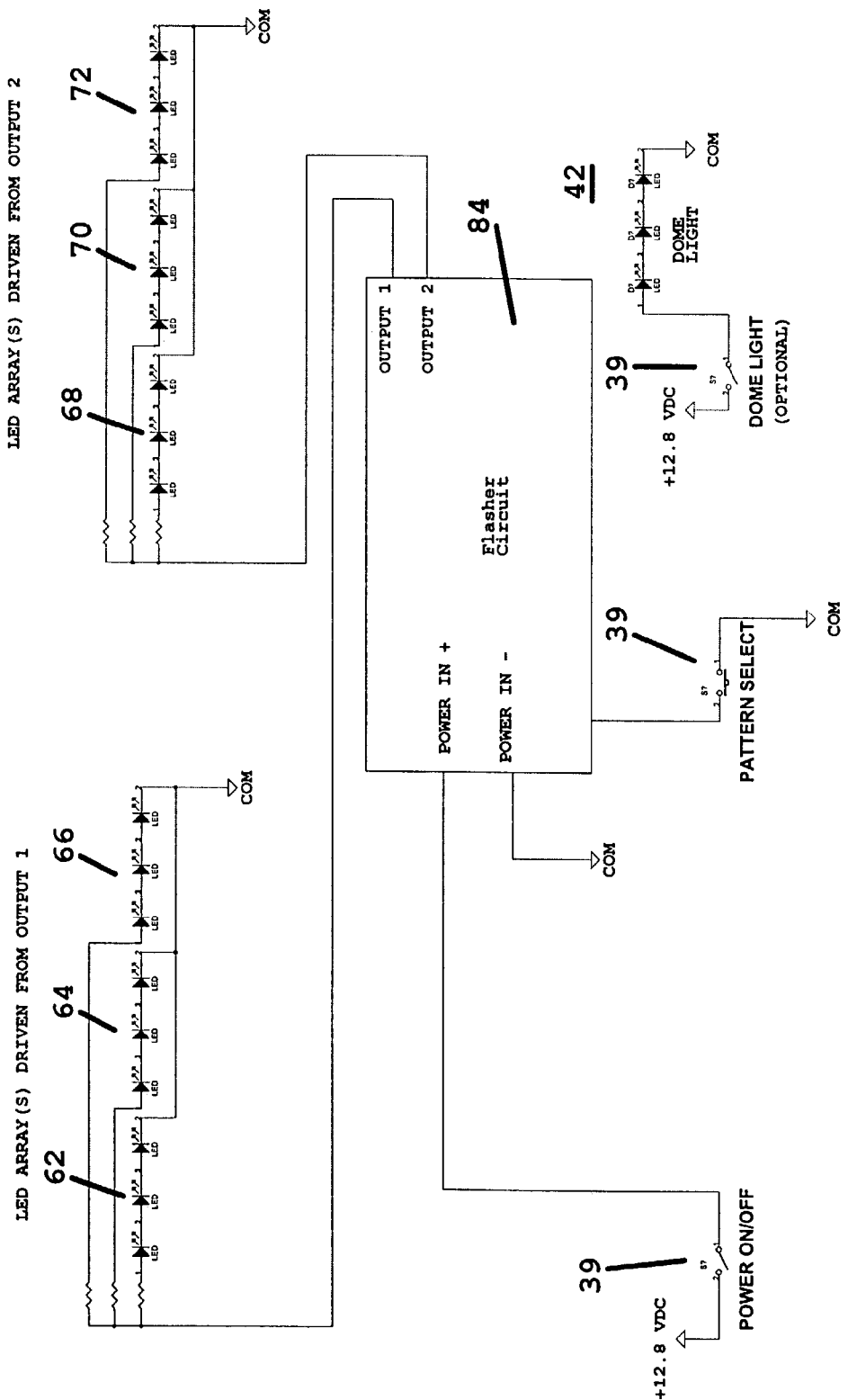
FIG. 13 is an electrical circuit diagram schematically illustrating the circuitry of the LED's but simplified to show only three banks of LED's each having a single row of LED's.

A plug 80, which may be received in an accessory or cigarette lighter socket, provides power to the LED's 24 through a helical electrical cord 82. Internally of the housing and preferably mounted on the bottom 38 is a box containing a flasher circuit 84 which is also shown in the schematic diagram (FIG. 13).

Another important feature of the invention is that the banks of LED's are in the channel behind the front edges 86 and 88 of the top 48 and bottom 38 (FIG. 3). The throat 39 therefore directs the illumination from the LED's outwardly through the windshield and reduces stray light. In other words, the throat acts as a hood for the LED's 24.

Referring to FIGS. 8, 9, 10, 11, 12, and 12a, there is shown a light bar 100 which has a housing of design similar to the light bar 18 and like parts are identified with like reference numerals to those used in connection with FIGS. 1–7. The improvements in the design are apparent from the figures showing the light bar 100. Specifically, the banks are mounted on a bar 104 which defines the angle or tilt of the banks 62–72. This bar may also serve as a spacer and receive the screws 50 for attaching the cover 48 to the bottom 38.

The light projecting ends of the LED's in each bank are assembled with its own lens array 63, 65, 67, 71, 73, 75, and 77. The lens arrays are transparent plates 101 which carry lenses in barrels 103 which fit over the ends of the LED's in their respective banks.

Another improvement is the mountings 128, which like the mountings 28 provide for vertical and angular adjustment. These mountings are hangers having slotted (forked) ends 130 and overlapping segments 132 and 134 which are clamped together by screws extending through a slot 136 in at least one of the sections 132. This slot allows for vertical adjustment up and down of the light bar 100 and the forked ends 130 allow for adjustment toward and away from the windshield of the light bar. The ends 130 and the overlapping segments 132 and 134 define a Z-shaped structure with the center leg of the Z (provided by the segments 132 and 134) inclined at an angle so as to provide fine adjustment toward and away from the windshield (vertically) as the segments are moved toward each other along the slot 136. The upper fork 130 is adapted to fit between the clip 13, which holds the visor, and the roof of the vehicle where the clip 13 is attached thereto. The clip 13 then serves a dual function of mounting the visor as well as the light bar.

Figure 13A:
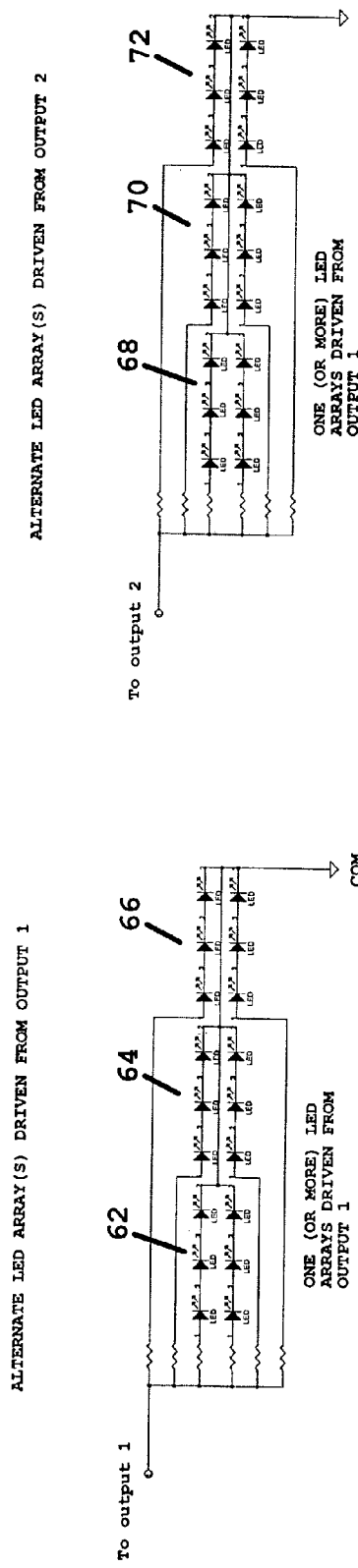
FIGS. 13a and 13b are schematic diagrams of the banks of LED's which are connectable to the outputs of the flasher circuit shown in FIG. 13 to illustrate that the banks may have two or three rows of LED's.
Figure 13B:
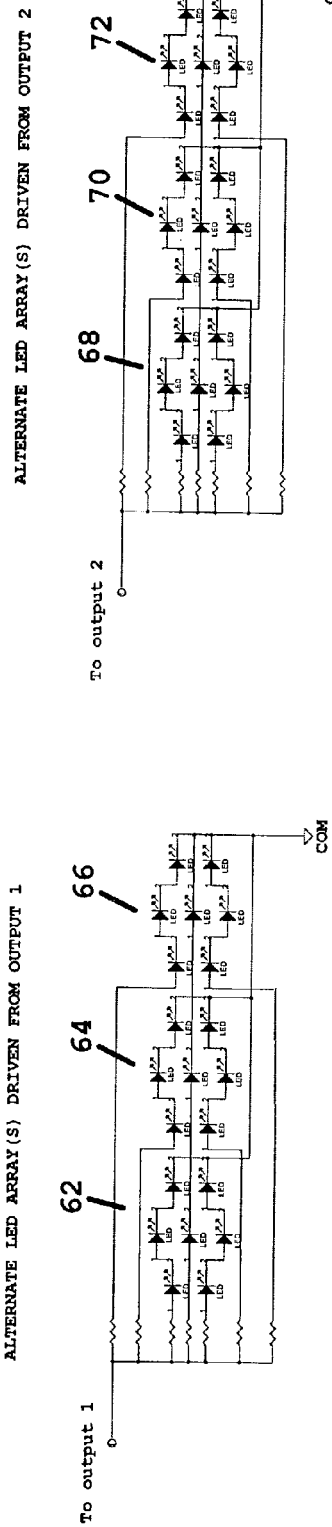

Referring to FIGS. 13, 13a and 13b, there is shown the power cord connected through one of the switches 39 to a flasher circuit 84 having two outputs, output one to the LED banks 62, 64 and 66 (FIGS. 3 and 5) on one side of the center of the light bar, and output two to the LED arrays 68, 70, and 72 on the opposite side. A switch 39 selects the pattern or sequence of flashing of the LED banks. Another switch controls LED's in the map/dome light 42. The LED's in the symmetrically disposed banks 62, 64, 66, and 68, 70, 72 may be of different color, such as red, white and blue. The flasher circuit 84 may include a microprocessor which upon each depression of the pattern selection switch 39 provides a different sequence of flashing from constant to various combinations as may be selected by the user by executing a cycle of closures of the pattern selection switch 39.

From the foregoing description, it will be apparent that there has been provided an improved interior light bar. Variations and modifications in the herein disclosed light bar and various aspects thereof, within the scope of the invention, will undoubtedly become apparent to those skilled in the art. Accordingly, the foregoing description should be taken as illustrative and not in a limiting sense.

What is claimed is:

1. A light bar providing illumination from inside a vehicle, through a window of the vehicle, said window being of a width extending laterally across the window, said window being of a height extending from bottom to top of the window, said light bar comprising a plurality of light emitting diodes (LED's) in at least one row of length corresponding substantially to the width of said window, a housing defining a channel containing said row of LED's, said channel having a throat which directs illumination from said row of LED's in a beam restricted by said throat through said window, and wherein said housing further comprises means for adjustably mounting said housing which enables adjustment of said housing and said throat angularly and vertically with respect to said window.

2. The light bar according to claim 1 wherein said mounting means comprises arms pivotably attached to said housing at opposite ends thereof to said vehicle.

3. The light bar according to claim 2 wherein said mounting means further comprises pads attached to said window near the top and at opposite ends of the width of said window, and said arms being pivotable at opposite ends thereof adjacent said pads and said housing ends, respectively.

4. The light bar according to claim 1 wherein said mounting means comprises at least one generally sloped hanger which is displaceably attached, for movement toward and away from said window, to said housing which defines said channel and an attachment above said windshield.

5. The light bar according to claim 4 wherein said slope is provided by said hanger being a generally Z-shaped bar having a center and legs, at least one of said legs defining a slot of sufficient length to enable adjustable positioning of said light bar housing.

6. The light bar according to claim 5 wherein said ends are fork-shaped to define said slot.

7. The light bar according to claim 5 wherein said slot is in both of said legs.

8. The light bar according to claim 5 wherein said center of said hanger is adjustable in height.

9. The light bar according to claim 8 wherein said center leg has overlapping sections which are adjustably, vertically positionable with respect to each other.

10. A light bar providing illumination from inside a vehicle, through a window of the vehicle, said window being of a width extending laterally across the window, said window being of a height extending from bottom to top of the window, said light bar comprising a plurality of light emitting diodes (LED's) in at least one row of length corresponding substantially to the width of said window, a housing defining a channel containing said row of LED's, said channel having a throat which directs illumination from said row of LED's in a beam restricted by said throat through said window, and wherein said housing has upper and lower walls closed at opposite ends, said walls defining said channel and said throat thereof and a back between said walls and ends wherein said walls and ends are plates of flexible material.

11. The light bar according to claim 10 wherein said material is plastic.

12. The light bar according to claim 10 wherein said LED's are mounted on boards which space said top and bottom walls from each other and define the height of said channel.

13. A light bar providing illumination from inside a vehicle, through a window of the vehicle, said window being of a width extending laterally across the window, said window being of a height extending from bottom to top of the window, said light bar comprising a plurality of light emitting diodes (LED's) in at least one row of length corresponding substantially to the width of said window, a housing defining a channel containing said row of LED's, said channel having a throat which directs illumination from said row of LED's in a beam restricted by said throat through said window, and wherein said throat and front of said housing is arcuately curved.

14. The light bar according to claim 13 wherein said window is a windshield curved along the width thereof and the curvature of said front of said housing and said throat corresponds to the curvature of said windshield.

15. A light bar providing illumination from inside a vehicle through a window thereof having a width and height, comprising a housing defining a channel extending laterally, said channel having an elongated throat, a plurality of banks of LED's each having one or more rows of height less than said channel disposed in said housing facing said throat, at least one of said banks being oriented to project illumination in a different direction through said window than others of said banks, and wherein said window is a windshield and said different direction of orientation of said at least one of said banks is generally parallel to said windshield so that illumination therefrom is generally perpendicular to said windshield and, other of said banks are tilted in opposite directions, said banks thereby providing illumination across an angle illumination toward right and left sides of said vehicle and between said right and left sides.

16. The light bar according to claim 15 wherein the color of illumination from certain of said banks is different from the color of illumination from other of said banks.

17. The light bar according to claim 15 wherein first and second pluralities of said banks are disposed about a region centrally of said housing.

18. The light bar according to claim 17 wherein the disposition of said banks is generally symmetrically about said centrally disposed region.

19. The light bar according to claim 18 wherein two of said symmetrically disposed banks are tilted angularly with respect to each other away from said window to project illumination in directions angularly corresponding to the tilt thereof.

20. The light bar according to claim 19 wherein said banks disposed between said tilted banks are oriented generally in the same direction to project illumination in the same general direction out through said window.

21. The light bar according to claim 15 further comprising means for energizing said banks to selectively provide continuous and different sequences of flashing illumination.

22. The light bar according to claim 15 further comprising optics attached to said banks for each LED thereof for focusing illumination provided from said banks.

23. The light bar according to claim 22 wherein said optics represent separate plates of transparent material carrying lenses disposed on the LED's of each bank.

24. A method for providing an interior light bar for a vehicle having a windshield comprising the steps of:
providing a light bar much narrower than said windshield in height, said bar having LED's for projecting light in different directions; and
attaching said light bar between the roof and visors of the vehicle to direct light from said light bar out of the windshield of the vehicle, and wherein said attaching step further comprises the step of adjustably attaching said light bar to one of the windshield of said vehicle or the visors of said vehicle by having rods or brackets from which said bar hangs.

25. A light bar providing illumination from inside a vehicle, through a window of the vehicle, said window being of a width extending laterally across the window, said window being of a height extending from bottom to top of the window, said light bar comprising a plurality of light emitting diodes (LED's) in at least one row of length corresponding substantially to the width of said window, a housing containing said row of LED's, illumination from said row of LED's being projected through said window; and wherein said housing further comprises means for adjustably mounting said housing which enables adjustment of said housing angularly and vertically with respect to said window.

26. The light bar according to claim 26 wherein said mounting means comprises arms pivotably attached to said housing at opposite ends thereof to said vehicle.

27. The light bar according to claim 27 wherein said mounting means further comprises pads attached to said window near the top and at opposite ends of the width of said window, and said arms being pivotable at opposite ends thereof adjacent said pads and said housing ends, respectively.

28. The light bar according to claim 25 wherein said mounting means comprises at least one generally sloped hanger which is displaceably attached, for movement toward and away from said window, to said housing and to an attachment above said windshield.

29. The light bar according to claim 28 wherein said slope is provided by said hanger being a generally Z-shaped bar having a center and legs, at least one of said legs defining a slot of sufficient length to enable adjustable positioning of said light bar housing.

30. The light bar according to claim 29 wherein said ends are fork-shaped to define said slot.

31. The light bar according to claim 29 wherein said slot is in both of said legs.

32. The light bar according to claim 29 wherein said center of said hanger is adjustable in height.

33. The light bar according to claim 32 wherein said center leg has overlapping sections which are adjustably, vertically positionable with respect to each other.

34. A light bar providing illumination from inside a vehicle, through a window of the vehicle, said window being of a width extending laterally across the window, said window being of a height extending from bottom to top of the window, said light bar comprising a plurality of light emitting diodes (LED's) in at least one row of length corresponding substantially to the width of said window, a housing containing said row of LED's, illumination from said row of LED's being projected through said window; and wherein said housing has at least one wall and opposite ends, and a back along said wall and between said ends, and wherein said wall and ends are plates of flexible material.

35. The light bar according to claim 34 wherein said material is plastic.

36. The light bar according to claim 35 wherein said LED's are mounted on boards which define the height of said housing.

37. A method for providing an interior light bar for use inside a vehicle against a windshield thereof comprising the steps of:
providing a light bar having LED's for projecting light, and said light bar being much narrower than said windshield in height and substantially the same length as said windshield;
attaching said light bar between the roof and visors of the vehicle to direct light from said light bar out of the windshield of the vehicle; and
wherein said attaching step further comprises the step of adjustably attaching said light bar to one of the windshield of said vehicle or the visors of said vehicle by having rods or brackets from which said bar hangs.

38. The method according to claim 37 wherein said attached light bar is located below said visors of the vehicle.

39. A light bar providing illumination from inside a vehicle through a window thereof comprising a housing presenting a laterally extending opening, a plurality of banks of LEDs having one or more rows disposed in said housing and facing out of said opening, at least one of said banks being generally parallel to said window so that illumination is projected generally perpendicular to said window and others of said banks being tilted in opposite directions, said banks thereby providing illumination across and angle sufficient to provide illumination toward right and left sides of said vehicle and between said right and left sides.

40. The light bar according to claim 39 wherein said window is a windshield of said vehicle which extends at least partially between right and left sides of said vehicle.

41. The light bar according to claim 40 wherein said at least one of said banks is laterally spaced from said titled banks and is disposed between said tilted banks.

* * * * *